United States Patent [19]

Baker et al.

[11] Patent Number: 4,462,837

[45] Date of Patent: Jul. 31, 1984

[54] CEMENT COMPOSITION AND METHOD OF CEMENT CASING IN A WELL

[75] Inventors: Wilford S. Baker, Thibodaux, La.; James J. Harrison, Glenshaw, Pa.

[73] Assignee: Gulf Oil Corporation, Pittsburgh, Pa.

[21] Appl. No.: 466,551

[22] Filed: Feb. 15, 1983

[51] Int. Cl.³ ............................................. C04B 7/353
[52] U.S. Cl. ........................................ 106/93; 166/293
[58] Field of Search .................. 106/93, 314; 166/293

[56] References Cited

U.S. PATENT DOCUMENTS 2,580,565  1/1952  Ludwig ................................. 106/93
3,465,824  9/1969  Kucera ................................. 106/93
3,483,007  12/1969  Hook ................................... 106/93

Primary Examiner—James Poer
Attorney, Agent, or Firm—Deane E. Keith; Forrest D. Stine; Richard C. Gaffney

[57] ABSTRACT

A novel cement composition for the preparation of a novel aqueous slurry useful in cementing casing in the borehole of a well comprising (1) cement, (2) (a) a hydroxyethylcellulose ether having a critical viscosity or (2) (b) a mixture of a hydroxyethylcellulose ether having a critical viscosity and of a hydroxypropylcellulose ether having a critical viscosity and (3) a dispersant.

43 Claims, No Drawings

CEMENT COMPOSITION AND METHOD OF CEMENT CASING IN A WELL

BACKGROUND OF THE INVENTION

1. Field of the Invention

This invention is directed to a novel cement composition for the preparation of a novel aqueous slurry useful in cementing casing in the borehole of a well comprising (1) cement, (2) (a) a hydroxyethylcellulose ether having a critical viscosity or (2) (b) a mixture of a hydroxyethylcellulose ether having a critical viscosity and of a hydroxypropylcellulose ether having a critical viscosity and (3) a dispersant.

2. Description of the Prior Art

After a borehole of an oil or gas well has been drilled, casing is run into the well and is cemented in place by filling the annulus between the borehole wall and the outside of the casing with a cement slurry, which is then permitted to set. The resulting cement provides a sheath surrounding the casing that prevents, or inhibits, communication between the various formations penetrated by the well. In addition to isolating oil, gas and water-producing zones, cement also aids in (1) bonding and supporting the casing, (2) protecting the casing from corrosion, (3) preventing blowouts by quickly forming a seal, (4) protecting the casing from shock loads in drilling deeper and (5) sealing off zones of lost circulation. The usual method of cementing a well is to pump a cement slurry downwardly through the casing, outwardly through the lower end of the casing and then upwardly into the annulus surrounding the casing. The upward displacement of the cement slurry through the annulus can continue until some of the cement slurry returns to the well surface, but in any event will continue past the formations to be isolated.

If the primary cementing of the casing, as described above, does not effectively isolate the formations, it may become necessary to perforate the casing at intervals along its length and then squeeze a cement slurry under high pressure through the perforations and into the defined annulus to plug any channels that may have formed in the cement sheath. Squeezing is an expensive operation that requires bringing perforating and cement service companies back to the well and is therefore to be avoided, if possible.

It is critical in preparing cement compositions useful in cementing casing in the borehole of a well that they be characterized by little or no fluid loss, the presence of little or no measureable free water, a viscosity designed for optimum particle suspension, optimum pumpability, flow properties sufficient to facilitate and maintain laminar and/or plug flow, adequate gel strength to provide thixotropic properties to the slurry when pumping ceases, thickening time tailored or designed to meet field specifications, high compressive strength and substantially no shrinking on setting.

SUMMARY OF THE INVENTION

We have found a novel cement composition particularly suitable for the preparation of a novel aqueous slurry useful in cementing casing in the borehole of a well having the desirable characteristics defined above which comprises (1) cement, (2)(a) a hydroxyethylcellulose ether having a critical viscosity or (2) (b) a mixture of a hydroxyethylcellulose ether having a critical viscosity and of a hydroxypropylcellulose ether having a critical viscosity and (3) a dispersant.

The cement, or first, component of the novel cement composition suitable for preparing the novel aqueous slurry can be any of the cements defined in API, Spec. 10, First Edition, page 6, or in ASTM C150. Examples of these cements are those defined by the API Classes "A" through "J". Of these we prefer to employ those defined in API Classes "H" and "J".

In order to obtain the novel cement composition defined and claimed herein, it is critical that the second component containing the hydroxyethylcellulose ether, and the hydroxypropylcellulose ether if present, have a critical viscosity. Viscosity is empirically related to the molecular weight of the hydroxyalkylcellulose ether, and it is the molecular weight of the hydroxyalkylcellulose ether which is the critical factor. The viscosity measurement is merely a convenient way of defining the molecular weight. In addition, the hydroxyalkylcellulose ethers will desirably possess a specified degree of substitution and a specified molar substitution.

As pointed out above, the second component can contain hydroxyethylcellulose ether along or a mixture of hydroxyethylcellulose ether and of hydroxypropylcellulose ether. In our preferred embodiment, the second component will consist substantially solely of hydroxyethylcellulose ether. If hydroxypropylcellulose ether is also used in combination with hydroxyethylcellulose ether, it can be present in any amount up to about 50 weight percent, based on the total weight of said hydroxyalkylcellulose ethers, but preferably will be present in an amount ranging from about five to about 20 weight percent, based on the total weight of said hydroxyalkylcellulose ethers.

As pointed out above, the viscosity of the hydroxyalkylcellulose ethers used herein is critical in order to obtain a cement composition having the desired characteristics defined above. In obtaining the viscosity measure required, a selected amount of the hydroxyalkylcellulose ether is dissolved in water at 25° C. and the resulting aqueous solution is measured in a Brookfield viscometer. The viscosity of the hydroxyethylcellulose ether must be above about 200 centipoises when measured in a five weight percent aqueous solution but less than about 6000 centipoises when measured in a one weight percent aqueous solution. In a preferred range the viscosity will be from about 1000 to about 10,000 centipoises when measured in a two weight percent aqueous solution. The critical viscosity of the hydroxypropylcellulose ether must be above about 100 centipoises when measured in a two weight percent aqueous solution, but less than about 10,000 centipoises when measured in a one weight percent aqueous solution. In a preferred range, the viscosity will be from about 1000 to about 3000 centipoises when measured in a one weight percent aqueous solution.

The degree of substitution and the molar substitution of the hydroxyalkylcellulose ethers used herein are also important. By "degree of substitution" we mean the average number of total substituents present per glucose unit, while by "molar substitution" we mean the number of mols of ethylene oxide or propylene oxide that are attached to each glucose unit. The degree of substitution can be in the range of about 0.5 to about 3.0, preferably from about 0.9 to about 2.8. The molar substitution can be in the range of about 0.5 to about 10.0, preferably from about 1.0 to about 6.0. It is understood that the hydroxyethylcellulose ether can also carry some propylene oxide substituents and, similarly, hydroxypropylcellulose ether can also carry some ethylene oxide units.

The third component required in the novel cement composition herein is a dispersant. By "dispersant" we mean to include any anionic surfactant, that is, any compound which contains a hydrophobic (for example, any hydrocarbon substituent, such as alkyl, aryl or alkaryl group) portion and a hydrophilic (for example, any negatively-charged moiety, such as $O-CO_2^-$ or $SO_3^-$) portion. We prefer to use sulfonic acid derivatives of aromatic or aliphatic hydrocarbons, such as naphthalene sulfonic acid formaldehyde condensation product derivatives, such as their sodium or potassium salts. Examples of dispersants that can be used include polynaphthalene sulfonates available from Dow Chemical Company, such as "TIC I"; lignosulfonates; CFR-2, a sulfonate dispersant sold by the Halliburton Company; sodium naphthalene sulfonate formaldehyde condensation products, such as DAXAD 19 of W. R. Grace Company, Lomar D of Diamond Shamrock Company, D 31 of B. J. Hughes Company, and D 65 of Dowell Company; and potassium naphthalene sulfonate formaldehyde condensation products, such as DAXAD 11 KLS of W. R. Grace Company.

Other additives conventionally added to cement compositions useful in cementing casings in the borehole of a well can also be added to the novel cement compositions herein in the amounts normally used. These additives can include, for example, (1) cement accelerators, such as calcium chloride, sodium chloride, gypsum, sodium silicate and sea water; (2) light-weight additives, such as bentonite, diatomaceous earth, gilsonite, coal, perlite and pozzolan; (3) heavy-weight additives, such as hematite, ilmenite, barite, silica flour and sand; (4) cement retarders, such as lignins, calcium lignosulfonates, CMHEC (carboxymethylhydroxyethylcellulose ether) and sodium chloride; (5) additives for controlling lost circulation, such as gilsonite, walnut hulls, cellophane flakes, gypsum cement, bentonite-diesel oil and nylon fibers; and (6) filtration control additives, such as cellulose dispersants, CMHEC and latex. In addition other unconventional additives, such as Xanthan gum, as disclosed in our copending application Ser. No. 466,550, entitled "Cement Compositions and Method of Cementing Casing in a Well", filed concurrently herewith, can also be used.

Table I below defines the amounts of hydroxyalkylcellulose ethers and dispersant that can be used herein to prepare the novel cement composition based on the weight of the dry cement.

TABLE I

|  | Weight Percent | |
| --- | --- | --- |
|  | Broad Range | Preferred Range |
| Total Hydroxy-alkylcellulose ether | 0.01 to 0.6 | 0.1 to 0.5 |
| Dispersant | 0.01 to 3.0 | 0.1 to 2.0 |

The above novel cement composition is merely mixed with any suitable aqueous material used in preparing aqueous cement slurries, for example, water itself, to prepare the novel aqueous cement slurry possessing the desired characteristics; for example having the desired density and setting and pumping properties. Mixing of the novel cement composition with the aqueous solution can be effected in any suitable or conventional manner, for example, by mixing the dry ingredients before addition to the aqueous solution or by adding the individual components to an aqueous slurry of cement.

Table II below defines the amounts of each of the components that can be used to prepare the novel aqueous cement slurry claimed herein, based on the weight of the dry cement.

TABLE II

|  | Weight Percent | |
| --- | --- | --- |
|  | Broad Range | Preferred Range |
| Total Hydroxy-alkylcellulose ether | 0.01 to 0.6 | 0.1 to 0.5 |
| Dispersant | 0.01 to 3.0 | 0.1 to 2.0 |
| Water | 25 to 80 | 35 to 70 |
| KCl* | 0 to 7 | 1 to 5 |

*Based on the weight of the water.

The weight ratio of dispersant (D) to total hydroxyalkylcellulose ether (P) should be in the range of about 10:1 to about 1:5, preferably from about 5:1 to about 1:1.

Cement tests were carried out in the laboratory to evaluate the cement slurries prepared in accordance with out invention. The practices and procedures defined in API Spec 10, First Edition, January 1982, were followed. Appropriate bottom hole circulating temperatures (BHCT), bottom hole static temperatures (BHST) and pressures were chosen for the tests. The BHCT applies for fluid loss, free water, total thickening time, viscosity, initial gel strength and yield point tests. BHST applies for compressive strength and hesitation squeeze tests. Satisfactory results from these tests will fall within the following specifications.

The fluid loss of the above slurry, as determined in accordance with API Spec 10, First Edition, January 1982, pages 72–74, will always be below about 500 milliliters at 1000 psi (6894 kPa), generally below about 200 milliliters at 1000 psi, most generally in the range of about five to about 100 milliliters at 1000 psi.

The amount of free water in the cement slurry, as determined in accordance with the above API Spec 10, page 18, will always be below about 1.4 weight percent, generally in trace amounts (the top of the resulting cement will be moist), but most generally will be free of water (the top of the resulting cement will be dry and crusty).

The total thickening time of the slurry, as determined in accordance with the above API Spec. 10 pages 22–31, can easily be adjusted to meet field requirements. This can be, for example, within the range of about two to about eight hours, generally from about three to about eight hours, but most preferably about four to about six hours.

The viscosity of the slurry, as determined in accordance with API Bulletin RP 13B, Sixth Edition, April 1976, page 6, will be in centipoises at 300R in the range of about 30 to about 400, generally from about 50 to about 300, but most generally from about 100 to about 250.

The initial gel strength of the slurry, as determined in accordance with the above API Bulletin RP 13B, page 6, in pounds per 100 square feet at 3 RPM, will be about two to about 50 pounds/100 square feet (0.1 to 2.5 kg/m$^2$), generally about six to about 30 pounds/100 square feet (0.3 to 1.5 kg/m$^2$), but most generally from about 10 to about 20 pounds/100 square feet (0.5 to 1.0 kg/m$^2$).

The yield point of the slurry as determined in accordance with the above API Bulletin RP 13 B, page 6, in

TABLE III

| Run No. | % HEC[1] | Viscosity[2] of HEC[1] | % HPC[3] | Viscosity[2] of HPC[3] | % Dispersant[4] | % KCl | % of Other Additives | D/P[5] | BHCT °F. (°C.) | Fluid Loss (ml) | % Free Water | API Viscosity cp 300R | Gel Strength #/100 ft² (0.05 kg/m²) 3R | Yield Point #/100 ft² (0.05 kg/m²) 300R- (600R-300R) | Total Thickening Time, Hrs. | Compressive Strength #/in² (6.895 kPa) 48 Hrs. | Remarks |
|---|---|---|---|---|---|---|---|---|---|---|---|---|---|---|---|---|---|
| 1 | 0 | — | 0 | — | 1.0 | 5 | — | — | 152 (67) | 928 | 11 | 20 | 3 | −4 | NT[7] | NT[7] | Too thin |
| 2 | 0.2 | N250MBR | 0 | — | 1.0 | 5 | — | 5.0 | 152 (67) | 132 | 0 | NT[7] | NT[7] | NT[7] | NT | NT | — |
| 3 | 0.17 | N250MBR | 0.03 | KH | 1.0 | 5 | — | 5.0 | 152 (67) | 136 | 0 | 77 | 4 | 13 | NT | NT | — |
| 4 | 0.17 | N250MBR | 0.03 | KG | 1.0 | 5 | — | 5.0 | 152 (67) | 173 | 0 | 75 | 3 | 19 | NT | NT | — |
| 5 | 0.17 | N250MR | 0.03 | KH | 1.0 | 5 | — | 5.0 | 152 (67) | 212 | 0 | 110 | 2 | 2 | NT | NT | — |
| 6 | 0.17 | N250MR | 0.03 | KG | 1.0 | 5 | — | 5.0 | 152 (67) | 174 | 0 | 52 | 5 | 11 | NT | NT | — |
| 7 | 0.17 | N250LR | 0.03 | KH | 1.0 | 5 | — | 5.0 | 152 (67) | 574 | 3 | 24 | 3 | −1 | NT | NT | Too thin |
| 8 | 0.17 | N250LR | 0.03 | KG | 1.0 | 5 | — | 5.0 | 152 (67) | 602 | 3 | 22 | 3 | −1 | NT | NT | Too thin |
| 9 | 0.17 | N210LR | 0.03 | KH | 1.0 | 5 | — | 5.0 | 152 (67) | 536 | 3 | 20 | 2 | −3 | NT | NT | Too thin |
| 10 | 0.17 | N210LR | 0.03 | KG | 1.0 | 5 | — | 5.0 | 152 (67) | 610 | Trace | 21 | 3 | −3 | NT | NT | Too thin |
| 11 | 0.17 | N250HHR | 0.03 | KH | 1.0 | 5 | — | 5.0 | 152 (67) | 148 | 0 | 82 | 4 | 12 | NT | NT | — |
| 12 | 0.17 | N250HHR | 0.03 | KG | 1.0 | 5 | — | 5.0 | 152 (67) | 140 | 0 | 74 | 2 | 5 | NT | NT | — |
| 13 | 0.17 | N250HHW | 0.03 | KH | 1.0 | 5 | — | 5.0 | 152 (67) | 148 | 0 | 75 | 3 | 16 | NT | NT | — |
| 14 | 0.17 | N250HHW | 0.03 | KG | 1.0 | 5 | — | 5.0 | 152 (67) | 158 | 0 | 77 | 2 | 20 | NT | NT | — |
| 15 | 0.17 | N250H4R | 0.03 | KH | 1.0 | 5 | — | 5.0 | 152 (67) | 136 | Trace | 74 | 3 | 17 | NT | NT | — |
| 16 | 0.17 | N250H4R | 0.03 | KG | 1.0 | 5 | — | 5.0 | 152 (67) | 139 | 0 | 75 | 4 | 10 | NT | NT | — |
| 17 | 0.25 | N250MBR | 0 | — | 1.0 | 5 | — | 4.0 | 152 (67) | 86 | 0 | NT | NT | NT | NT | NT | — |
| 18 | 0.30 | N250MBR | 0 | — | 1.0 | 5 | — | 3.33 | 152 (67) | 60 | 0 | NT | NT | NT | NT | NT | — |
| 19 | 0.35 | N250MBR | 0 | — | 1.0 | 5 | — | 2.86 | 152 (67) | 52 | 0 | NT | NT | NT | NT | NT | — |
| 20 | 0.40 | N250MBR | 0 | — | 1.0 | 5 | — | 2.50 | 152 (67) | 46 | 0 | NT | NT | NT | NT | NT | — |
| 21 | 0.213 | N250MBR | 0.037 | KH | 1.0 | 5 | — | 4.0 | 152 (67) | 106 | 0 | 113 | 3 | 32 | NT | NT | — |
| 22 | 0.255 | N250MBR | 0.045 | KH | 1.0 | 5 | — | 3.33 | 152 (67) | 86 | 0 | 146 | 5 | 44 | NT | NT | — |
| 23 | 0.298 | N250MBR | 0.052 | KH | 1.0 | 5 | — | 2.86 | 152 (67) | 56 | 0 | 120 | 6 | 48 | NT | NT | — |
| 24 | 0.34 | N250MBR | 0.06 | KH | 1.0 | 5 | — | 2.5 | 152 (67) | 55 | 0 | 180 | 10 | 80 | NT | NT | — |
| 25 | 0.34 | N250HHR | 0.06 | KH | 1.0 | 5 | — | 2.5 | 152 (67) | 44 | Trace | 271 | 17 | 242 | NT | NT | — |
| 26 | 0.34 | N150HHW | 0.06 | KH | 1.0 | 5 | — | 2.5 | 152 (67) | 33 | 0 | 227 | 11 | 154 | NT | NT | — |
| 27 | 0.34 | N250H4R | 0.06 | KH | 1.0 | 5 | — | 2.5 | 152 (67) | 42 | 0 | 229 | 13 | 182 | NT | NT | — |
| 28 | 0.14 | N250MBR | 0.06 | KH | 1.0 | 5 | — | 5.0 | 152 (67) | 214 | Trace | 63 | 3 | 11 | NT | NT | — |
| 29 | 0.175 | N250MBR | 0.075 | KH | 1.0 | 5 | — | 4.0 | 152 (67) | 137 | Trace | 74 | 5 | 13 | NT | NT | — |
| 30 | 0.21 | N250MBR | 0.09 | KH | 1.0 | 5 | — | 3.33 | 152 (67) | 106 | Trace | 110 | 7 | 35 | NT | NT | — |
| 31 | 0.245 | N250MBR | 0.105 | KH | 1.0 | 5 | — | 2.86 | 152 (67) | 94 | Trace | 110 | 5 | 36 | NT | NT | — |
| 32 | 0.28 | N250MBR | 0.120 | KH | 1.0 | 5 | — | 2.5 | 152 (67) | 70 | 0 | 158 | 7 | 68 | NT | NT | — |
| 33 | 0.10 | N250MBR | 0.10 | KH | 1.0 | 5 | — | 5.0 | 152 (67) | 400 | 3 | 37 | 7 | −3 | NT | NT | Too thin* |
| 34 | 0.125 | N250MBR | 0.125 | KH | 1.0 | 5 | — | 4.0 | 152 (67) | 306 | 2 | 51 | 12 | 7 | NT | NT | * |
| 35 | 0.15 | N250MBR | 0.15 | KH | 1.0 | 5 | — | 3.33 | 152 (67) | 175 | 1 | 64 | 3 | 8 | NT | NT | * |
| 36 | 0.175 | N250MBR | 0.175 | KH | 1.0 | 5 | — | 2.86 | 152 (67) | 189 | 1 | 68 | 6 | 10 | NT | NT | — |
| 37 | 0.20 | N250MBR | 0.20 | KH | 1.0 | 5 | — | 2.5 | 152 (67) | 149 | 0 | 83 | 7 | 20 | NT | NT | — |
| 38 | 0.255 | N250MBR | 0.045 | KH | 1.0 | 3 | 0.10 Xanthan Gum 0.08 CMHEC[6] | 2.5 | 152 (67) | 86 | 0 | NT | NT | NT | NT | 1550 | — |
| 39 | 0.34 | N250MBR | 0.06 | KH | 1.089 | 3 | — | 2.27 | 201 (94) | 54 | 0 | NT | NT | NT | 4.40 | NT | — |
| 40 | 0.34 | N250MBR | 0.06 | KH | 0.908 | 3 | — | 2.27 | 201 (94) | 90 | 0 | NT | NT | NT | 3.13 | 3319 | — |
| 41 | 0.374 | N250MBR | 0.066 | KH | 1.195 | 0 | 0.1 | 2.21 | 256 (125) | 44 | 0 | NT | NT | NT | NT | 2990 | — | pounds/100 square feet will be in the range of about 1 to about 250 pounds/100 square feet (0.05 to 12.5 kg/m$^2$), generally from about five to about 150 pounds/100 square feet (0.25 to 7.5 kg/m$^2$), but most generally from about 8 to about 100 pounds/100 square feet (0.4 to 5.0 kg/m$^2$).

The compressive strength of the cement, upon setting, as determined in accordance with the above API Spec 10, page 49, will always be above about 1500 psig (10,342.5 kPa), generally in the range of about 2000 to about 8000 psig (13,790 to 55,160 kPa), but most generally from about 2000 to about 4000 psig (13,790 to 27,580 kPa).

We have found that, in general, the compressive strength of the cement prepared in accordance with this invention is independent of the gel strength.

The novel cement slurry herein can then be pumped downwardly into the casing that has been suspended in the borehole of a well and then circulated upwardly into the annulus surrounding the casing. Circulation can continue until the slurry fills that portion of the annular space desired to be sealed and can continue until the cement slurry returns to the surface. In one embodiment wherein the novel cement slurry herein can be utilized, the borehole can be slanted from the vertical. The cement slurry is then maintained in place until the cement sets. The cement so produced will result in a strong, continuous, unbroken bond with the outside surface of the casing and with the wall of the formation.

In a preferred method of cementing casing in a well employing the cement composition of this invention, a lead-scavenger is displaced upwardly through the annulus surrounding the casing and followed by the novel aqueous cement slurry prepared in accordance with the invention herein, for convenience in this description referred to as "pay slurry". An example of a lead-scavenger cement slurry that can be used herein is a gel cement slurry cntaining, for example, from about 10 to about 20 weight percent bentonite, based on the weight of the cement, and about 0 to about 1.0 weight percent of a lignosulfonate retarder. The cement and bentonite are then mixed with sea water, or an aqueous solution containing about three weight percent sodium chloride, to form a slurry having a density of about 11.0 to about 14.0 pounds per gallon (1320 to 1680 grams per liter). The lead-scavenger cement slurry has a low viscosity which results in turbulent flow of the slurry through the annulus at substantially lower velocities than are necessary for turbulent flow of the pay slurry. The lead-scavenger slurry removes drilling mud and the drill cuttings which are present between the wall of the borehole and the outer surface of the casing. The pay slurry of the cement follows the lead-scavenger slurry into the annulus and is held in place until the cement sets. The annular flow patterns, reported in Reynolds No. values, for the scavenger slurry are generally maintained within the range of about 2000 to about 4000, preferably about 2500 to about 3500, while those for the pay slurry are maintained within the range of about 400 to about 1900, preferably about 500 to about 1800.

DESCRIPTION OF PREFERRED EMBODIMENTS

A number of cement slurries were prepared from a number of cement compositions and tested. Each cement slurry was prepared using 800 grams of Class H cement. In each of Runs Nos. 1 to 40, 46 weight percent of water, based on the dry cement, was used. In Run No. 41, 40 weight percent of water, based on the weight of the dry cement, was used. The cement slurries so prepared and the test results based thereon are further defined below the Table III. The viscosities of the hydroxyalkylcellulose ethers used in the preparation of the cement slurries are set forth below in Table IV.

TABLE III-continued

| Run No. | % HEC[1] | Viscosity[2] of HEC[1] | % HPC[3] | Viscosity[2] of HPC[3] | % Dispersant[4] | % KCl | % of Other Additives | D/P[5] | BHCT °F. (°C.) | Fluid Loss (ml) | % Free Water | API Viscosity cp 300R | Gel Strength #/100 ft² (0.05 kg/m²) 3R | Yield Point #/100 ft² (0.05 kg/m²) 300R- (600R-300R) | Total Thickening Time, Hrs. | Compressive Strength #/in² (6.895 kPa) 48 Hrs. | Remarks |
|---|---|---|---|---|---|---|---|---|---|---|---|---|---|---|---|---|---|
| | | | | | | | CMHEC[6] | | | | | | | | | | |

[1]hydroxyethylcellulose ether
[2]defined in Table IV below
[3]hydroxypropylcellulose ether
[4]CFR-2, a sulfonate dispersant of Halliburton Company
[5]Weight ratio of dispersant to total celluloses in system
[6]carboxymethylhydroxyethylcellulose ether
[7]"NT" throughout the table means Not Taken
*Free water too high

TABLE IV

| Hydroxy-alkyl-cellulose Ether | Molar Substi-tution | Viscosity, Centipoises | | |
|---|---|---|---|---|
| | | 1 Wt % | 2 Wt % | 5 Wt % |
| N250MBR | 2.5 | — | 4500–6500 | — |
| N250MR | 2.5 | — | 4500–6500 | — |
| N250HHR | 2.5 | 3400–5000 | — | — |
| N150HHW | 1.5 | 3400–5000 | — | — |
| N250H4R | 2.5 | 2600–3300 | — | — |
| N210LR | 2.1 | — | — | 75–150 |
| N250LR | 2.5 | — | — | 75–150 |
| KH | ~4 | 1500–2500 | — | — |
| KG | ~4 | — | 150–400 | — |

A study of the data in Table III above clearly illustrates the superior and beneficial results arising from the novel cement slurries prepared using our novel cement compositions. The absence of the specific hydroxyalkylcellulose ethers in Run No. 1 results in a cement slurry having a fluid loss of 928 milliliters, the presence of 11 weight percent free water and a yield point of −4, showing solids separation and a slurry that was too thin to be useful or satisfactory in well cementing operations. Runs Nos. 3–16 and 25–27 show the effect of using hydroxyalkylcellulose ethers of varying viscosities. Thus, when the viscosities of the hydroxyalkylcellulose ethers were outside the critical ranges defined herein in each of Runs Nos. 7–10, the cement slurry was too thin to be useful in well cementing operations. Runs Nos. 2 and 17–24 and 28–37 show the effect of varying the ratio of hydroxyethylcellulose ether to hydroxypropylcellulose, ether from 100:0 to 50:50. Examination of Runs 33–35 wherein the hydroxyethylcellulose ether to hydroxypropylcellulose ether ratio is 50:50, shows unsatisfactory performance. For this reason we prefer to use a hydroxyethylcellulose ether to hydroxypropylcellulose ether ratio of less than 50:50. Runs Nos. 38 and 39 show the advantageous results obtained by the additional presence of xanthan gum and of carboxymethylhydroxyethylcellulose ether, respectively, in the novel cement composition herein. A comparison of Run No. 40 with Run No. 39 shows that the presence of carboxymethyhydroxyethylcellulose ether in Run No. 39 further reduces fluid loss in the cement. Run No. 41 additionally shows that the presence of KCl in the cement slurry is not critical.

Obviously, many modifications and variations of the invention, as hereinabove set forth, can be made without departing from the spirit and scope thereof, and therefore only such limitations should be imposed as are indicated in the appended claims.

We claim:

1. A novel cement composition for the preparation of a novel aqueous slurry useful in cementing casing in the borehole of a well comprising (1) cement, (2) (a) a hydroxyethylcellulose ether having a viscosity above about 200 centipoises when measured in a five weight percent aqueous solution, but less then about 6000 centipoises when measured in a one weight percent aqueous solution or (2) (b) a mixture of a hydroxyethylcellulose ether having a viscosity above about 200 centipoises when measured in a five weight percent aqueous solution, but less than about 6000 centipoises when measured in a one weight percent aqueous solution and a hydroxypropylcellulose ether having a viscosity above about 100 centipoises when measured in a two weight percent aqueous solution, but less than about 10,000 centipoises when measured in a one weight percent aqueous solution, wherein said hydroxypropylcellulose ether is present in an amount up to about 20 weight percent based on the total weight of said hydroxyalkylcellulose ethers, and (3) a dispersant.

2. The composition of claim 1 comprising (1) cement, (2) a hydroxyethylcellulose ether having a viscosity above about 200 centipoises when measured in a five weight percent aqueous solution, but less than about 6000 centipoises when measured in a one weight percent aqueous solution, and (3) a dispersant.

3. The composition of claim 2 wherein said hydroxyethylcellulose ether has a viscosity in the range of about 100 to about 10,000 centipoises when measured in a two weight percent aqueous solution.

4. The composition of claim 1 comprising (1) cement, (2) a mixture of a hydroxyethylcellulose ether having a viscosity above about 200 centipoises when measured in a five weight percent aqueous solution, but less than about 6000 centipoises when measured in a one weight percent aqueous solution and a hydroxypropylcellulose ether having a viscosity above about 100 centipoises when measured in a two weight percent aqueous solution, but less than about 10,000 centipoises when measured in a one weight percent aqueous solution, and (3) a dispersant.

5. The composition of claim 4 wherein said hydroxyethylcellulose ether has a viscosity in the range of about 1000 to about 10,000 centipoises when measured in a two weight percent aqueous solution and said hydroxypropylcellulose ether has a viscosity of about 1000 to about 3000 centipoises when measured in a one weight percent aqueous solution.

6. The composition of claim 4 wherein said hydroxypropylcellulose ether is present in an amount ranging from about five to about 20 weight percent, based on the total weight of the hydroxyalkylcellulose ethers.

7. The composition of claim 5 wherein said hydroxypropylcellulose ether is present in an amount ranging from about five to about 20 weight percent, based on the total weight of the hydroxyalkylcellulose ethers.

8. The composition of claim 1 wherein the degree of substitution on said hydroxyalkylcellulose ethers is in the range of about 0.5 to about 3.0.

9. The composition of claim 1 wherein the degree of substitution on said hydroxyalkylcellulose ethers is in the range of about 0.9 to about 2.8.

10. The composition of claim 1 wherein the molar substitution of said hydroxyalkylcellulose ethers is in the range of about 0.5 to about 10.0.

11. The composition of claim 1 wherein the molar substitution of said hydroxyalkylcellulose ethers is in the range of about 1.0 to about 6.0.

12. The composition of claim 1 wherein the cement is selected from API Classes A through J.

13. The composition of claim 1 wherein the cement is selcted from API Classes H and J.

14. The composition of claim 1 wherein said dispersant is an anionic surfactant.

15. The composition of claim 1 wherein said dispersant is a sulfonic acid derivative of an aromatic or aliphatic hydrocarbon.

16. The composition of claim 1 wherein said dispersant is a polynaphthalene sulfonate.

17. The composition of claim 1 wherein said dispersant is a sodium naphthalene sulfonate formaldehyde condensation product.

18. The composition of claim 1 wherein said dispersant is a potassium naphthalene sulfonate formaldehyde condensation product.

19. The composition of claim 1 wherein said cement composition contains from about 0.01 to about 0.6 weight percent of said hydroxyalkylcellulose ethers and from about 0.01 to about 3.0 weight percent by weight of said dispersant, based on the weight of the cement.

20. The composition of claim 1 wherein said cement composition contains from about 0.1 to about 0.5 weight percent of said hydroxyalkylcellulose ethers and from about 0.1 to about 2.0 weight percent by weight of said dispersant, based on the weight of the cement.

21. The composition of claim 1 wherein the weight ratio of said dispersant to total hydroxyalkylcellulose ethers is in the range of about 10:1 to about 1:5.

22. The composition of claim 1 wherein the weight ratio of said dispersant to total hydroxyalkylcellulose ethers is in the range of about 5:1 to about 1:1.

23. An aqueous cement slurry prepared using the novel cement composition of claim 1 containing from about 0.01 to about 0.6 weight percent of said hydroxyalkylcellulose ethers, from about 0.01 to about 3.0 weight percent of said dispersant and from about 25 to about 80 weight percent of water, based on the weight of the cement.

24. The aqueous cement slurry of claim 23 containing from about 0.01 to about 0.5 weight percent of said hydroxyalkylcellulose ethers, from about 0.1 to about 2.0 weight percent of said dispersant and from about 35 to about 70 weight percent of water, based on the weight of the cement.

25. The aqueous cement slurry of claim 23 that additionally contains up to about five weight percent of KCl by weight of water.

26. The aqueous cement slurry of claim 24 that additionally contains from about one to about five weight percent KCl by weight of water.

27. A method of cementing casing in the borehole of a well comprising suspending the casing in the borehole, pumping downwardly into said casing an aqueous cement slurry comprising (1) water, (2) cement, (3) (a) a hydroxetylcellulose ether having a viscosity above about 200 centipoises when measured in a five weight percent aqueous solution, but less than about 6000 centipoises when measured in a one weight percent aqueous solution, or (3) (b) a mixture of a hydroxyethylcellulose ether having a viscosity above about 200 centipoises when measured in a five weight percent aqueous solution, but less than about 6000 centipoises when measured in a one weight percent aqueous solution and a hydroxypropylcellulose ether having a viscosity of above about 100 centipoises when measured in a two weight percent aqueous solution, but less than about 10,000 centipoises when measured in a one weight percent aqueous solution, wherein said hydroxypropylcellulose ether is present in an amount up to about 20 weight percent based on the total weight of said hydroxyalkylcellulose ethers, and (4) a dispersant, then circulating said aqueous cement slurry upwardly into the annulus surounding said casing, continuing said circulation until said slurry fills that portion of the annular space desired to be sealed and then maintaining said slurry in place until the cement sets.

28. The process according to claim 27 wherein said aqueous cement slurry comprises (1) water, (2) cement, (3) a hydroxetylcellulose ether having a viscosity above about 200 centipoises when measured in a five weight percent aqueous solution, but less than about 6000 centipoises when measured in a one weight percent aqueous solution, and (4) a dispersant.

29. The process according to claim 28 wherein said hydroxyethylcellulose ether in said aqueous cement slurry has a viscosity in the range of about 1000 to about 10,000 centipoises when measured in a two weight percent aqueous solution.

30. The process according to claim 27 wherein said aqueous cement slurry comprises (1) water, (2) cement, (3) a mixture of a hydroxethylcellulose ether having a viscosity above about 200 centipoises when measured in a five weight percent aqueous solution, but less than about 6000 centipoises when measured in a one weight percent aqueous solution and a hydroxypropylcellulose ether having a viscosity above about 100 centipoises when measured in a two weight percent aqueous solution, but less than about 10,000 centipoises when measured in a one weight percent aqueous solution, and (4) a dispersant.

31. The process according to claim 30 wherein said hydroxyethylcellulose ether in said aqueous cement slurry has a viscosity in the range of about 1000 to about 10,000 centipoises when measured in a two weight percent aqueous solution and said hydroxpropylcellulose ether has a viscosity of about 1000 to about 3000 centipoises when measured in a one weight percent aqueous solution.

32. The process according to claim 30 wherein said hydroxpropylcellulose ether in said aqueous cement slurry is present in an amount ranging from about five to about twenty weight percent based on the total weight of the hydroxyalkylcellulose ethers.

33. The process according to claim 31 wherein said hydroxpropylcellulose ether is present in said aqueous cement slurry in an amount ranging from about five to about twenty weight percent, based on the total weight of the hydroxyalkylcellulose ethers.

34. The process according to claim 27 wherein the substitution on said hydroxyalkylcellulose ethers in said aqueous cement slurry is in the range of about 0.5 to about 3.0.

35. The proces according to claim 27 but wherein the molar substitution of said hydroxyalkylcellulose ethers in said aqueous cement slurry is in the range of about 0.5 to about 10.0.

36. The process according to claim 27 wherein said aqueous cement slurry contains from about 0.01 to about 0.6 weight percent of said hydroxyalkylcellulose ethers and from about 0.01 to about 3.0 weight percent by weight of said dispersant, based on the weight of the cement.

37. The process according to claim 27 wherein said aqueous cement slurry contains from about 0.1 to about 0.5 weight percent of said hydroxyalkylcellulose ethers and from about 0.1 to about 2.0 weight percent by weight of said dispersant, based on the weight of the cement.

38. The process according to claim 27 wherein the amount of water in said aqueous cement slurry is from 25 to 80 weight percent water based on the weight of the cement.

39. The process according to claim 28 wherein the weight percent water based on the weight of the cement is from 35 to about 70.

40. The process according to claim 28 wherein said aqueous cement slurry contains additionally up to about five weight percent of KCl by weight of water.

41. The process according to claim 27 but wherein said aqueous cement slurry additionally contains KCl.

42. The process according to claim 27 wherein the passage of said aqueous cement slurry through said casing is preceded by passage therethrough of a lead-scavenger quantity of cement slurry.

43. The process according to claim 27 wherein said borehole is slanted from the vertical.

* * * * *